United States Patent
Ould-Brahim

(10) Patent No.: US 7,423,980 B2
(45) Date of Patent: Sep. 9, 2008

(54) FULL MESH STATUS MONITOR

(75) Inventor: Hamid Ould-Brahim, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 749 days.

(21) Appl. No.: 10/883,206

(22) Filed: Jul. 1, 2004

(65) Prior Publication Data

US 2006/0002408 A1   Jan. 5, 2006

(51) Int. Cl.
*H04L 12/28* (2006.01)
*H04L 12/56* (2006.01)

(52) U.S. Cl. .................................. 370/255; 370/406

(58) Field of Classification Search ......... 370/254–256, 370/401, 406
See application file for complete search history.

(56) References Cited

U.S. PATENT DOCUMENTS

| | | | |
|---|---|---|---|
| 7,154,889 B1 * | 12/2006 | Rekhter et al. | 370/392 |
| 2004/0037279 A1 * | 2/2004 | Zelig et al. | 370/390 |
| 2004/0233891 A1 * | 11/2004 | Regan et al. | 370/351 |
| 2004/0252634 A1 * | 12/2004 | Regan et al. | 370/216 |
| 2005/0073963 A1 * | 4/2005 | Goodfellow et al. | 370/255 |
| 2005/0111375 A1 * | 5/2005 | Ravindran et al. | 370/252 |
| 2005/0213513 A1 * | 9/2005 | Ngo et al. | 370/254 |
| 2006/0002401 A1 * | 1/2006 | Mukherjee et al. | 370/401 |
| 2006/0182037 A1 * | 8/2006 | Chen et al. | 370/252 |
| 2007/0189191 A1 * | 8/2007 | Ades | 370/254 |

* cited by examiner

*Primary Examiner*—Chau Nguyen
*Assistant Examiner*—Andrew Chriss
(74) *Attorney, Agent, or Firm*—Ridout & Maybee LLP

(57) ABSTRACT

A method for verifying full mesh status in a network is disclosed. The network includes endpoint entities in full mesh configuration. The method includes a step of maintaining a first value in the endpoint entities. The first value is related to counting of network endpoint entities. Another step in the method is maintaining a second value in the endpoint entities. The second value is related to counting non-operational transmission paths before a point in time. An additional step in the method is discovering an additional value related to counting non-operational transmission paths after the point in time. Yet another step in the method is comparing the additional value with the first value and the second value.

8 Claims, 3 Drawing Sheets

FULL MESH STATUS MONITOR

FIELD OF THE INVENTION

This invention relates to a mechanism for monitoring full mesh status in a network and, in particular, improved auto-discovery within a network of full mesh configured forwarders.

BACKGROUND OF THE INVENTION

Reference will be made in this application to layer-2. Layer-2 is sometimes called the link layer. In addition to the link layer, there are other layers including the network layer, the physical layer and the optical layer. The traditional role of layer-2 is switching. Layer-2 services (such as frame relay, ATM, Ethernet) can be emulated over an Internet Protocol (IP) or Multi-Protocol Label Switching (MPLS) backbone by encapsulating the layer-2 packet data units (PDUs) and then transmitting them over pseudo-wires.

Virtual private local area network (LAN) service (VPLS) is an Internet-based multipoint-to-multipoint layer-2 virtual private network (L2VPN). With VPLS, multiple Ethernet LAN sites can be interconnected to each other across an MPLS backbone. To the customer, all sites that are interconnected by VPLS appear to be on the same Ethernet LAN (even though traffic travels across a service provider network).

VPLS interconnects a set of VPLS forwarders. VPLS forwarders are virtual entities inside provider edge devices (PEs). For a given VPLS instance, there is one VPLS forwarder in a given PE. Some of the forwarders are considered "spokes", and some are considered "hubs". In a given VPLS instance, there must be pseudo-wire binding every hub VPLS forwarder to every other hub VPLS forwarder. This means that every hub PE in the VPLS instance must have a pseudo-wire to each other hub PE in the VPLS instance. When this condition holds, we say that the VPLS instance is fully meshed. When the VPLS PEs are fully meshed, every ingress PE can send a VPLS packet to egress PE(s) directly, without the need for an intermediate PE.

It is possible that a given VPLS instance may fail to be fully meshed. This may happen for the following reasons: configuration errors, failure of the auto-discovery process, failure of the control plane to properly establish all the necessary pseudo-wires (this in turn may be due to bugs, or to resource shortages at the PEs), and failure of the data plane to carry traffic correctly on all established pseudo-wires (this can occur if there are bugs in the capsulation/de-capsulation procedures at the PEs or bugs in the forwarding procedures at intermediate nodes).

If a VPLS instance is not fully meshed, then it will not provide the LAN-like service over which its users are depending. For instance, if a link state routing algorithm is using its LAN procedures over a VPLS instance which is not fully meshed, the selected set of routes may have "black holes".

Therefore there needs to be a mechanism in the emulated LAN to identify the falling out of full mesh status, so that appropriate steps can be taken to restore the full mesh. One known mechanism is to run Spanning-Tree Protocol (STP) over each emulated LAN pseudo-wire. This method has scaling problems because of the number of Bridge Protocol Data Units (BPDUs) that need to be sent by each VPLS forwarder.

Another known method involves each VPLS forwarder having a list of other VPLS forwarders. In addition, each VPLS forwarder has a list of VPLS forwarders with which it has established operational pseudo-wires. Identifying whether or not the full mesh status exists involves comparing the two lists. This method also has scaling problems because it requires knowing the identifiers of all the VPLS forwarders. Also the list may not be discovered at once, since the discovery can be an incremental process.

SUMMARY OF THE INVENTION

An object of the present invention is to provide an improved full mesh status monitor.

According to a first aspect of the present invention, there is disclosed a method for verifying full mesh status in a network, the network including endpoint entities in full mesh configuration, the method including the steps of:

maintaining a first value in the endpoint entities, the first value being related to counting of network endpoint entities;

(2) maintaining a second value in the endpoint entities, the second value being related to counting non-operational transmission paths before a point in time;

(3) discovering an additional value related to counting non-operational transmission paths after the point in time; and (4) comparing the additional value with the first value and the second value.

According to another aspect of the invention, there is disclosed a network. The network includes transmission paths and at least two endpoint entities configured for full mesh connectivity. The connectivity is provided by the transmission paths. The network also includes an auto-discovery mechanism incorporating endpoint entity count information and status information of the transmission paths. The auto-discovery mechanism facilitates reporting of full mesh status.

According to yet another aspect of the invention, there is disclosed a method for an endpoint entity to recognize that an associated emulated LAN is down. The method includes the steps of:

maintaining full mesh status information in the endpoint entity that indicates the emulated LAN is up;

(2) discovering newer full mesh status information that indicates the emulated LAN is down; and (3) comparing said newer full mesh status information to said full mesh status information, and then the endpoint entity recognizes the emulated LAN has changed to a down state.

In one embodiment of this method, the newer full mesh status information is discovered using an auto-discovery mechanism. The auto-discovery mechanism includes a TLV related to counting non-operational transmission paths.

An advantage of the present invention is that it reduces scaling problems and improves emulated LAN restoration times.

Another advantage of the present invention is that it does not require every endpoint entity to maintain a list of all endpoint entities and their identifiers.

Yet another advantage of the present invention is that it reduces the need to capture operations status in discovery.

Further features and advantages will become apparent from the following detailed description taken in conjunction with the accompanying drawings.

DETAILED DESCRIPTION

In this application, reference will be made to certain text files (i.e., files having the filename extension "txt"). These are Internet-Draft documents which have been published on the Internet Engineering Task Force web site (ietf.org).

Figure 1:
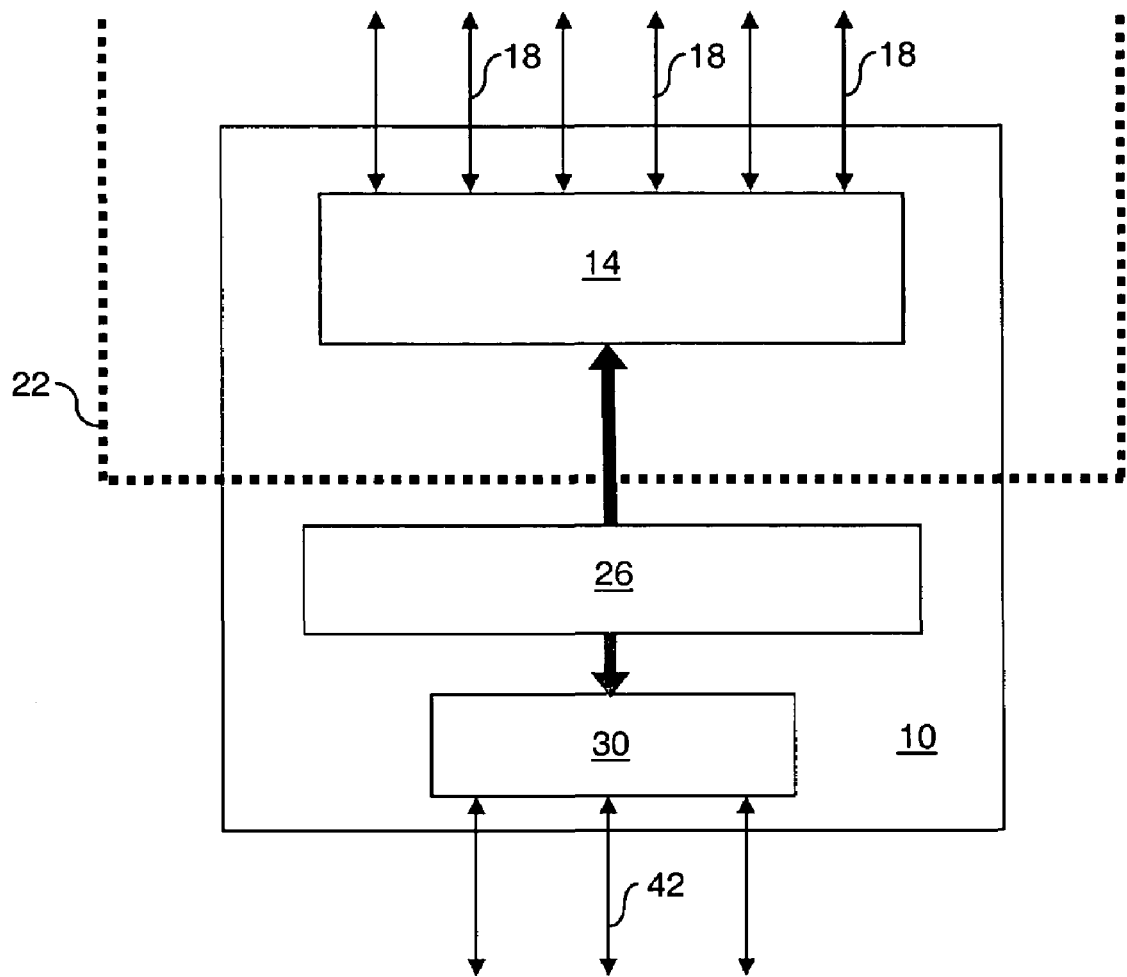
FIG. 1 is a diagram illustrating a VPLS provider edge device.

Referring to FIG. 1, there is illustrated a VPLS PE 10. Within the PE 10 is a VPLS forwarder 14 which is connected to pseudo-wires 18. The forwarder 14 has several functions, and it includes an operational state identifier, a discovery related component, a signaling related component and an encapsulation related component. The forwarder 14 is configured for full mesh connectivity.

With respect to the pseudo-wires 18, each of the pseudrn-wires 18 can be thought of as connecting the forwarder 14 to another forwarder. However if the forwarder 14 is not a part of the same VPLS as another forwarder, then there will be no pseudo-wire 18 between the forwarder 14 and that other forwarder. The pseudo-wires 18 provide the full mesh connectivity if they are all in an UP state. Protocol used to set up each of the pseudo-wires 18 must allow a forwarder at one end of the pseudo-wire to identify the forwarder at the other end. Pseudo-wires are described in detail in "Pseudowire Setup and Maintenance using LDP", Martini, et al., available at ietf.org, the entire contents of which are incorporated herein by reference.

If all of the pseudo-wires 18 are operational, then the VPLS forwarder 14 considers emulated LAN 22 to be in an UP state. If even one of the pseudo-wires 18 is in a DOWN state, the emulated LAN 22 is also considered to be in a DOWN state.

The emulated LAN 22 communicates its operational status (UP/DOWN) to an upper layer. To facilitate this, an emulated LAN interface 26 is provided so that the forwarder b can interface with bridge 30. The bridge 30 is within the PE 10, but outside of the emulated LAN 22. The bridge 30 does MAC address learning on the attachment circuits (ACs). The bridge 30 also does MAC address learning on the emulated LAN interface 26, but does not do MAC address learning on the pseudo-wires b, as the pseudo-wires 18 are hidden behind the emulated LAN interface 26.

Several definitions of the term bridge can be considered.

Definition 1; a bridge is a combination of hardware and software that connects LANs together.

Definition 2; a bridge is any device that connects two physically distinct network segments.

Definition 3; a bridge is a device that connects two similar LANs.

Typically, bridges transfer data in packets between two networks, without making any changes or interpreting the data in any way. With respect to the bridge 30, it must (at a minimum) be able to learn Media Access Control (MAC) addresses, and age MAC addresses out.

There is a link management protocol for the bridge 30. One possible link management protocol is STP. STP is a layer-2 protocol. STP defines a tree that spans all bridges/switches in an extended network. STP forces certain redundant data paths in a stand-by (locked) state. If one network segment in STP becomes unreachable, or if STP costs change, the spanning-tree algorithm reconfigures a spanning-tree topology and reestablishes a link by activating the stand-by path.

At the commencement of a spanning-tree operation, the execution of the spanning-tree algorithm causes the bridges/switches to elect a single bridge/switch, among all the bridges/switches within each network, to be the root bridge/switch. The root bridge/switch is the logical centre of the spanning-tree topology in a switch network. All paths that are not needed to reach the root bridge/switch from anywhere in the switch network are placed in STP backup mode.

All bridges/switches in extended LAN participating in STP gather information on other bridges/switches in a network through an exchange of data messages. These messages are called Bridge Protocol Data Units (BPDUs). BPDUs contain information about the transmitting bridge/switch and its ports, including switch and port MAC addresses, switch priority, port priority, and port costs. The STP uses this information to elect the root bridge/switch and root port for the switch network, as well as the root port and designated port for each switch segment.

A BPDU exchange results in the following. Firstly, one bridge/switch is selected as the root bridge/switch. Secondly, the shortest distance to the root bridge/switch is calculated for each bridge/switch. Thirdly, a designated bridge/switch is selected. This is the bridge/switch closest to the root bridge/switch through which frames will be forwarded to the root. Fourth, a port for each bridge/switch is selected. This is the port providing the best path from the bridge/switch to the root bridge/switch. Fifth, ports included in the STP are selected. Each port on a bridge/switch using STP exists in one of the following five states: blocking, listening, learning, forwarding and disabled.

The VPLS architecture associated with the provider edge device illustrated in FIG. 1 can be termed edge-to-edge MPLS. in this architecture, MPLS is deployed all the way between service provider edges. There are also decoupled models. In a decoupled model, there is an access network between the VPLS forwarder 14 and the emulated LAN interface 26. The VPLS forwarder 14 is in one provider edge device (network-facing PE or N-PE), and the bridge 30 is in a different provider edge device (user-facing PE or U-PE). Decoupled TLS (see K. Kompella, et al. "Decoupled Virtual Private LAN Services", Internet Engineering Task Force PPVPN Working Group, Internet Draft, November 2002), Hierarchical VPLS (see M. Lasserre, et al. "Virtual Private LAN Services over MPLS", Internet Engineering Task Force Provider Provisioned VPN Working Group, Internet Draft March 2003), Logical PE (see D. Mohan, et al. "VPLS/LPE L2VPNs: Virtual Private LAN Services using Logical PE Architecture", Internet Engineering Task Force Provider Provisioned VPN Working Group, Internet Draft, March 2002) and GVPLS (see V. Radocac, et al., "GVPLS/LPE-Generalized VPLS Solution based on LPE Framework", Internet Engineering Task Force Provider Provisioned VPN Working Group, Internet Draft, June 2003) are examples of decoupled VPLS architectures.

Figure 2:
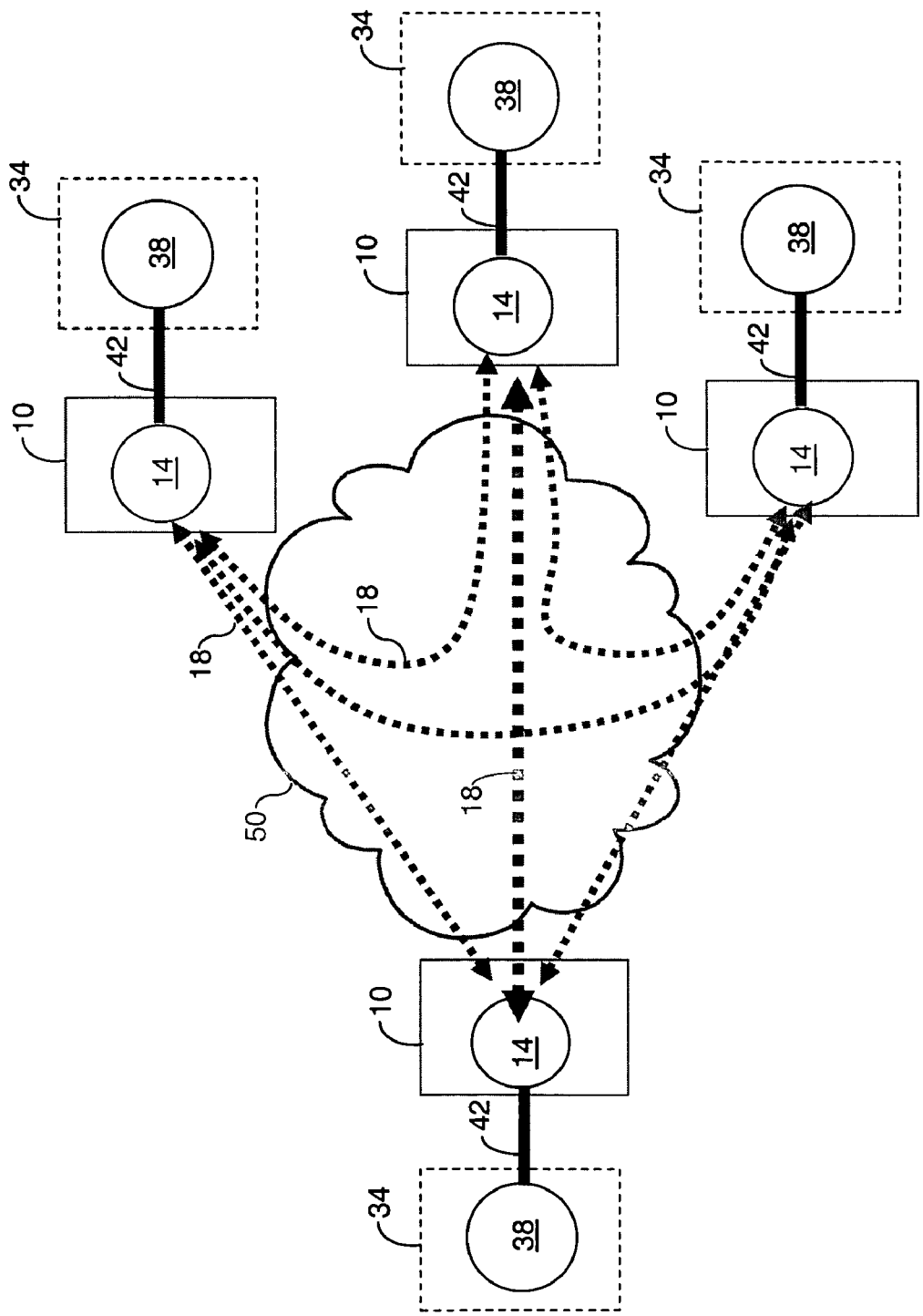
FIG. 2 is a diagram illustrating a network reference model with pseudo-wires extending between provider edge devices.

In FIG. 2, Ethernet LANs 34 are connected together through the emulated LAN. Within the Ethernet LANs 34 are one or more client edge devices (CEs) 38. The CEs 38 can include hosts, routers and/or bridges. A transmission path 42 is provided between the bridge 30 and the CE 38. The transmission path 42 is within what is referred to as ACs. In any type of L2VPN, AC is a circuit or virtual circuit that attaches a CE to a PE.

The pseudo-wires 18 extend across service provider network b (the network 50 is an MPLS and/or IP network). When the PE b receives a PDU on a particular AC, it must determine the pseudo-wire 18 on which the PDU must be forwarded. In general, this is done by considering the incoming AC, possibly the contents of the PDU's layer-2 header, and forwarding information. Similarly, when the PE 10 receives a PDU on a particular pseudo-wire, it must determine the AC on which the PDU must be forwarded. This is done by considering the incoming pseudo-wire, possibly the contents of the PDU's layer-2 header, and possibly some forwarding information which may be statically or dynamically maintained.

There is a general formula associated with the configuration illustrated in FIG. 2. Assuming there are n forwarders all belonging to a particular VPLS instance, there will be n-1 pseudo-wires for each forwarder, and there will be (n-1)! pseudo-wires in total.

Applying the formula, there are four of the forwarders 14. Therefore (assuming a single VPLS instance) there are 4-1 (or 3) pseudo-wires for each of the forwarders 14. The total number of the pseudo-wires 18 is 3! (or 6). It will be appreciated that the total number of the pseudo-wires 18 will be large for all but single digit numbers of the forwarders 14. For example, if there are 10 of the forwarders 14, then the total number of the pseudo-wires 18 is 9! (or 362,880). Scaling thus becomes an issue because of the BPDU volume potential.

A method in accordance with an embodiment of the present invention will now be described. First, each VPLS forwarder is configured or discovers the number of VPLS forwarders making up the emulated LAN 22. A first value VFN will be maintained in each of the VPLS forwarders 14. VFN equals the number of the VPLS forwarders b making up the emulated LAN 22 less 1. This is fitting (recall the n-1 formula discussed previously). A change to VFN changes the operational status of the emulated LAN to DOWN for a period of time.

VFN can be configured, or distributed using an auto-discovery mechanism. VFN can be incrementally learnt if we assume that the provider network 50 will allow a given time t for discovery to run its course. It will be appreciated by one skilled in the art that VFN distribution can be decoupled from the auto-discovery mechanism.

Each of the forwarders 14 also maintains a second value VFA. VFA is a count of the pseudo-wires 18 which are in a DOWN state. Therefore VFA will equal 0 when all the pseudo-wires 18 are UP. Thus, when VFA equals 0 the emulated LAN is considered UP. When VFA does not equal 0 the emulated LAN is considered DOWN. It is important to note that VFA needs to be distributed through discovery even when VFA is pre-configured. A discovered VFA value (DVFA) needs to be compared to the configured VFA. DVFA is a value in addition to the VFN and VFA values. When a DVFA is received by a particular forwarder, that DVFA will relate to a count of non-operational pseudo-wires at a later point in time than the count associated with the VFA that the DVFA will be compared to.

The method for verifying full mesh status thus includes maintaining VFN and VFA values in the forwarders 14. The method also includes the steps of discovering DVFA, and comparing that DVFA with the VFN and VFA values in the forwarders 14.

Addition or deletion of VPLS forwarders impacts the VFN and VFA values. When a new VPLS forwarder joins the full mesh, the new VPLS forwarder will distribute its new VFN number (which is DVFA). Similarly when one of the forwarders 14 is removed, the VFN is decremented and a new value is advertised.

Figure 3:
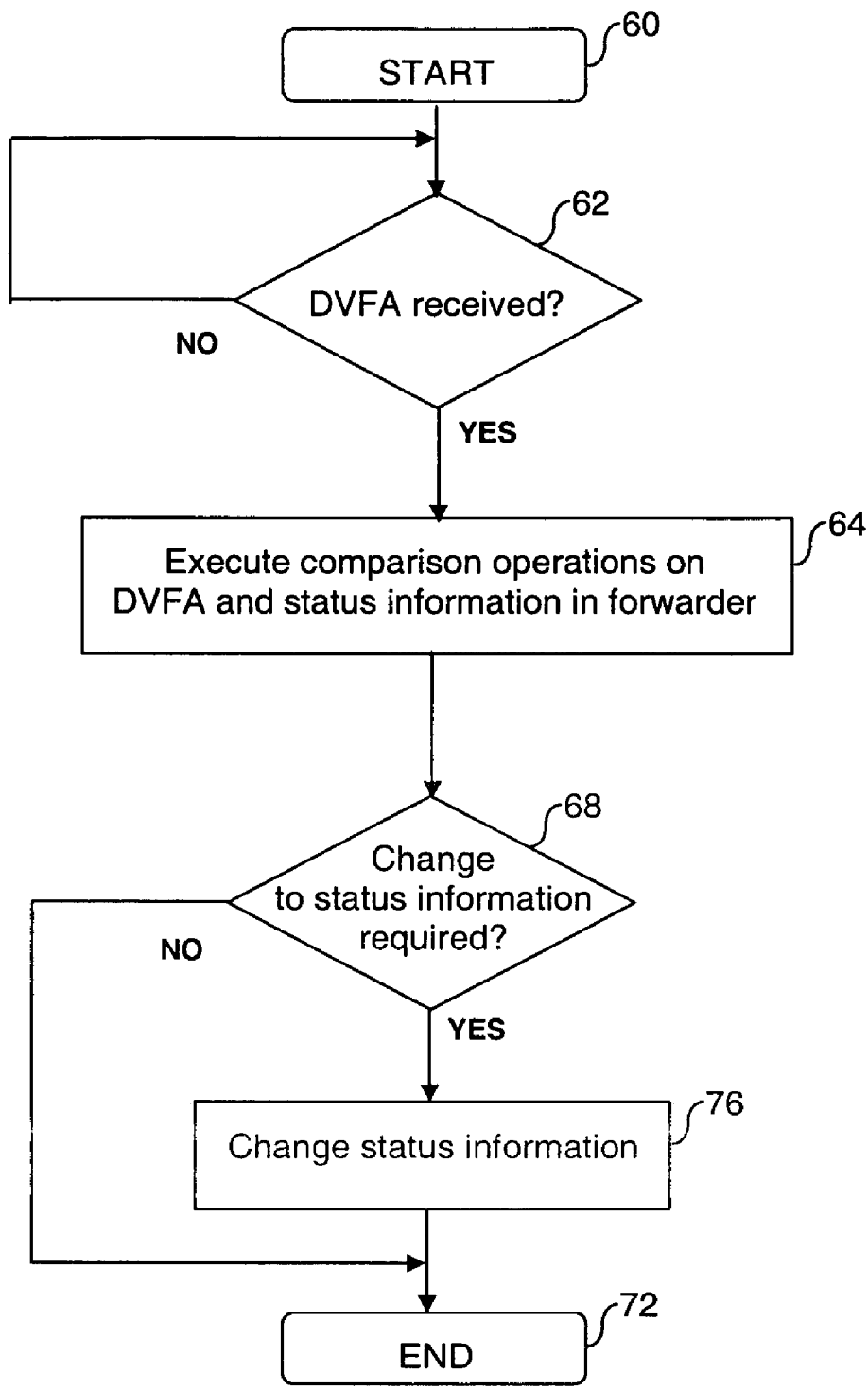
FIG. 3 is a flow diagram illustrating operations within a VPLS forwarder based on a discovered value related to counting operational transmission paths.

FIG. 3 is a flow chart illustrating operations which are performed when the forwarder 14 receives the DVFA. At step 60 operations commence. At step 62, the forwarder 14 tests if the DVFA value has been received. If it has not, the forwarder 14 continues its waiting to receive the DVFA value. If the DVFA value has been received, the operation proceeds to step 64 and comparison operations are performed. The new full mesh status information contained in the DVFA value is compared to the full mesh status information maintained in the forwarder 14.

At step 68 a test is made on the results of the comparison operations of step 64. If a change to the full mesh status information is required the process proceeds to step 76. If no change is not required, the next step is to conclude this round of the process at "End" step 72.

At step 76, operations are performed to change the full mesh status information. A selected one of VFN, VFA, and VFN and VFA will be updated at the step 76. It will be appreciated that proceeding to step 76 may be the consequence of not only bugs/errors in one or more of the pseudo-wires 18, but also other alternative occurrences including addition of a VPLS forwarder and removal of a VPLS forwarder. Upon completion of step 76 this round of the process concludes at "End" step 72.

VPLS auto-discovery is described in detail in "Framework for Layer 2 Virtual Private Networks (L2VPNs)", Andersson, et al., available at ietf,org, the entire contents of which are incorporated herein by reference. In order for the VPLS auto-discovery mechanism to be able to facilitate reporting of full mesh status, there will need to be an addition of a type-length-value (TLV) element for the DVFA to the VPLS auto-discovery mechanism.

As explained previously, forwarder count information and status information of the pseudo-wires can be furnished by the DVFA. Thus the VPLS auto-discovery mechanism with the additional TLV will be incorporating forwarder count information and status information of the pseudo-wires.

In one particular embodiment of the invention, a total number of VPLS forwarders (TVF) is maintained in each of the VPLS forwarders 14. The TVF is the number of VPLS forwarders discovered plus 1. The TVF allows the VFN to be corrected in the situation where new VPLS forwarders are added concurrently, and a PE receives the same DVFA which does not reflect the total number of VPLS forwarders.

It will be appreciated that the embodiment of the invention described in conjunction with FIGS. 1 and 2 is an embodiment of the invention suitable for VPLS. In more general nomenclature, the forwarders 14 are endpoint entities. For example, in an alternative embodiment of the invention, the LAN service is IP-only LAN-like service (IPLS) instead of VPLS. In this embodiment of the invention, the endpoint entities are CEs.

Transmission paths between the forwarders 14 have been characterized as pseudo-wires, and this term has a somewhat narrow meaning in Internet engineering. It will be appreciated by one skilled in the art that there are other types of transmission paths over a service provider network besides pseudo-wires.

Glossary of Acronyms Used

AC—Attachment Circuit
BPDU—Bridge Protocol Data Unit
CE—Client Edge Device
IP—Internet Protocol
IPLS—IP-only LAN-like Service
L2VPN—Layer-2 Virtual Private Network
LAN—Local Area Network
MAC—Media Access Control
MPLS—Multi-Protocol Label Switching
N-PE—Network-Facing PE
PDU—Packet Data Unit
PE—Provider Edge Device
STP—Spanning-Tree Protocol TLV—Type-Length-Value
U-PE—User-Facing PE
VPLS—Virtual Private LAN Service Numerous modifications, variations and adaptations may be made to the particular embodiments of the invention described above without departing from the scope of the invention, which is defined in the claims.

What is claimed is:

1. A network comprising:
   transmission paths;
   at least two endpoint entities configured for full mesh connectivity, said connectivity being provided by said transmission paths; and
   an auto-discovery mechanism incorporating endpoint entity count information and status information of said transmission paths,
   wherein said auto-discovery mechanism facilitates reporting of full mesh status.

2. A network as claimed in claim 1 wherein said auto-discovery mechanism includes a Type-Length-Value element related to counting non-operational transmission paths.

3. A network as claimed in claim 2 further comprising provider edge devices, each of said at least two endpoint entities being within a different one of said provider edge devices.

4. A network as claimed in claim 3 wherein said endpoint entities are forwarders, and said transmission paths are pseudo-wires.

5. A network as claimed in claim 4 wherein each of said provider edge devices includes a bridge and an emulated Local Area Network interface, said emulated Local Area Network interface permitting said bridge to interface with one of said forwarders, said bridge being capable of communicating with client edge devices.

6. A network as claimed in claim 5 further comprising Bridge Protocol Data Units on said transmission paths.

7. A network as claimed in claim 6 wherein said auto-discovery mechanism is a Virtual Private Local Area Network Service auto-discovery mechanism.

8. A network as claimed in claim 3 wherein said provider edge devices are network-facing provider edge devices.

* * * * *